(12) United States Patent
Grayson

(10) Patent No.: US 6,665,278 B2
(45) Date of Patent: *Dec. 16, 2003

(54) WIRELESS NETWORKED MESSAGE ROUTING

(75) Inventor: Paul D. Grayson, Lancaster (GB)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,454

(22) Filed: Jul. 29, 1998

(65) Prior Publication Data

US 2003/0043763 A1 Mar. 6, 2003

(30) Foreign Application Priority Data

Jul. 29, 1997 (GB) .............................. 9715857

(51) Int. Cl.[7] ........................... H04Q 7/20; H04L 12/54
(52) U.S. Cl. ...................... 370/328; 370/400; 714/749
(58) Field of Search ................................ 370/237, 229, 370/235, 328, 400, 331, 394, 428; 714/748, 749

(56) References Cited

U.S. PATENT DOCUMENTS

| 4,551,834 A | * | 11/1985 | Lienard ..................... 370/394 |
| 5,771,352 A | * | 6/1998 | Nakamura et al. ...... 395/200.57 |
| 6,002,669 A | * | 12/1999 | White ......................... 370/443 |
| 6,064,654 A | * | 5/2000 | Hauser ....................... 370/248 |
| 6,128,283 A | * | 10/2000 | Sabaa et al. ................ 370/236 |

FOREIGN PATENT DOCUMENTS

| EP | 0695058 A2 | 7/1995 | ........... H04L/12/28 |

* cited by examiner

Primary Examiner—Steven H. D. Nguyen
Assistant Examiner—Duc Duong

(57) ABSTRACT

A wireless communication system includes a number of devices to be clustered for the exchange of data and control message packets. Each node (ON, IN1 to IN5) has a unique address within the cluster and is arranged to accept only messages transmitted to it. A dynamic re-routing technique is provided whereby a message packet (M) not received by its target node is detected and re-routed via one or a succession of other nodes of the cluster until either transmission is successful or a predetermined number of failed attempts has been made. The system provides distributed control and intelligence with intermediate nodes for re-routing being selected randomly and current count values for unsuccessful transmission attempts being included within the transmitted packet.

5 Claims, 6 Drawing Sheets

| NA | TNA | MT | ONA | PN | DL | DA | | CRC |
|---|---|---|---|---|---|---|---|---|

FIG. 5

| NA | TNA | MT | ONA | PN = 1 | DL | TNP | DA | | CRC |
|---|---|---|---|---|---|---|---|---|---|

FIG. 6

| NA | TNA | MT | ONA | PN | DL | DNA | SNA | HC | DA |
|---|---|---|---|---|---|---|---|---|---|

| | DA | CRC |
|---|---|---|

FIG. 7

| Node Address | Feature Flags | Feature Score |
|---|---|---|
| 1 | 1, 2, 5 | 3 |
| 34 | 3 | 0 |
| 36 | 4, 5, 6 | 1 |

WIRELESS NETWORKED MESSAGE ROUTING

BACKGROUND OF THE INVENTION

The present invention relates to networked systems composed of a plurality of devices clustered for the exchange of data and control messages formatted according to predetermined protocols and, in particular, to such systems where inter-device communication is via wireless link. The invention further relates to devices for use in groups or clusters to form such systems.

Networked interconnection of devices is well known, for example in hi-fi systems or security systems having detectors, a control panel and one or more alarm sounders. A development has been the so-called home bus systems where a greater variety of products have been linked with a view to providing enhanced overall functionality for example domestic audio/video apparatus coupled with a home security system and the use of telephone. An example of such a home bus system is the domestic digital bus (D2B), the communications protocols for which have been issued as standard IEC 1030 by the International Electrotechnical Commission in Geneva, Switzerland. The D2B system provides a single wire control bus to which all devices are interfaced with messages carried between the various devices of the system in a standardised form of data packet.

Even with a single wire link from device to device, the amount of inter-connection can become unwieldy leading to installation problems for the user, especially where a cluster of devices to be linked is spread across two or three rooms. In order to get around some of these problems, the use of radio frequency or infra-red communications has been proposed to replace the wired links with a central base station receiving messages from one device and forwarding to their destination device. The need for a base station introduces its own problems, not the least of which is the fact that each message must be transmitted twice, namely from its source to the base station and from the base station to its target. In terms of consumer systems, the user is constrained to buy the base station first and, being the most complex part of the system, it will generally be the most expensive. There is also the problem common to all such centralised systems, namely that if the base station fails, the whole system becomes unusable.

While the use of wireless communications removes some of the physical constraints on system installation, locations such as the home environment do not provide an ideal communications space. Where wireless communication between stations is via infra-red link, each communicating unit needs to have direct line of sight to the others, and data may be lost or unacceptably delayed simply through a user having walked across a room and interrupted the line of sight between two communicating devices. Radio frequency (RF) communications are an improvement in this respect, in that they can pass through walls, doors and ceilings: this makes RF communication particularly suited where clusters of devices spread across two or three rooms. While RF communication is less susceptible than IR to line of sight blockage, it does have a greater vulnerability to signal reflection leading to multi-path errors and garbling of data when received.

SUMMARY OF THE INVENTION

It is therefore an object of the present invention to provide a wireless communications system, and devices for use in the same, having reduced vulnerability to signal loss arising from line-of-sight blockage and/or signal multi-path effects.

In accordance with the present invention there is provided a wireless communications system comprising a plurality of nodes clustered for the exchange of data and control messages packets. Each node has a unique address within the system, and is arranged to ignore received messages not containing their own node address. Each node is arranged to generate and transmit an acknowledgement message to an originating node of a data packet received directly. Each node also has a store holding a node address for each other node of the system. Each node is arranged such that, on determining a lack of receipt of an acknowledgement message for a message packet transmitted to a target node, a further node address is selected from the store and said message packet is transmitted to a further node as a re-routed message packet, Each node is configured to identify the original target of a received re-routed message packet and to transmit the re-routed message packet to its original target.

By use of the node table carried (in full or partial form) by each of the devices making up a cluster, alternative routes from originating to target nodes may be selected dynamically in order to minimize the effects of short-term channel path interference or blockage. Such a re-routing procedure, not applicable to systems where all messages are routed through a base-station, makes use of the physical separation of the nodes or devices to provide a physical detour around blockages.

Suitably, each node is configured to generate and transmit an acknowledgement message to the transmitting node of a successfully received re-routed message packet, with each node re-sending a message packet a predetermined number of times if it does not receive an acknowledgement within an expected period. Re-routing need not be limited to the use of one intermediate node: each node may be operable to select, on determining the lack of a received acknowledgement message for a re-routed message packet, a still further node address from store, other than those of the target node and message originating node, and to transmit the message packet to this still further node as a re-routed message. Thus, an intermediate node unable to contact the target node may simply pass the message packet on to another node in the cluster to attempt to contact the target.

Where messages may be re-routed more than once, means are suitably provided to limit the number of re-routed transmissions of a message packet to a pre-determined number of re-routed transmissions. This may be achieved by each message packet carrying a data field reserved to indicating unsuccessful transmission of that message packet as a re-routed packet, and each node having means to modify the data field to increment the value on determination that no acknowledgement message has been received following transmission of the packet as a re-routed message packet. Thus, the indicator for the number of unsuccessful re-routed transmissions a message has had are carried within the message itself, and any device of the system can handle the message packet removal on detection that the data field has reached its maximum value.

The present invention also provides a device for use as a node within the above-described system, with the device comprising control means coupled with an address data store and a transceiver. The control means is operable to format data packets according to a predetermined protocol and transmit those packets via the transceiver, and to extract data from such packets received via the transceiver, wherein the device has an identifying address and is configured to ignore all received message packets not including the identifying address.

BRIEF DESCRIPTION OF THE DRAWINGS

Further features and advantages of the present invention will become apparent from reading of the description of a preferred RF transmission embodiment of the invention, given by way of example only and with reference to the accompanying drawings, in which:

FIGS. 4 to 7 show differing configurations of data packet as used for inter-device communication in a system embodying the invention;

DESCRIPTION OF THE PREFERRED EMBODIMENTS

Figure 1:
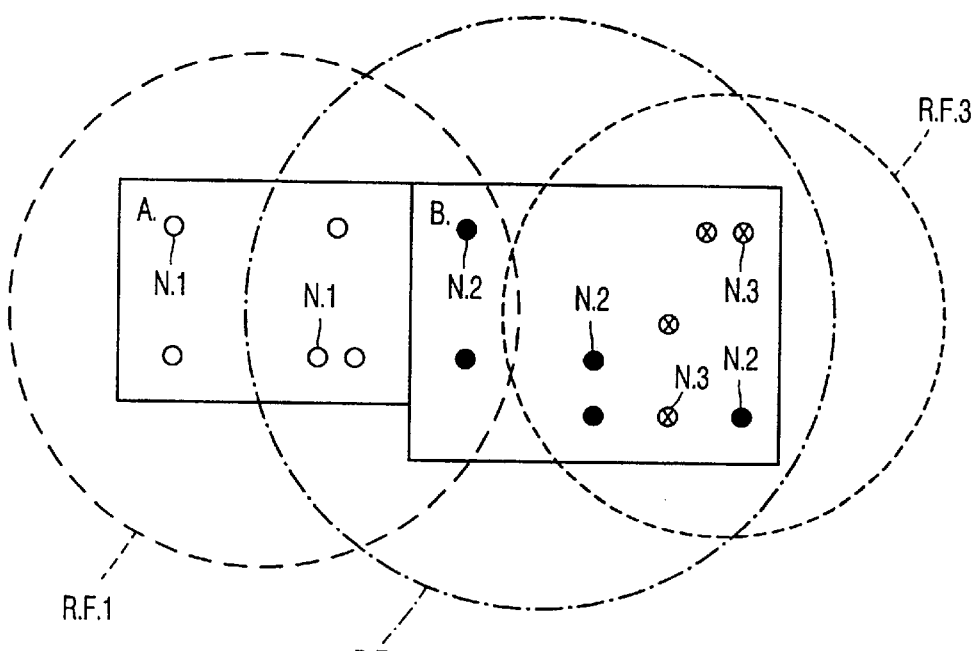
FIG. 1 represents an arrangement of devices forming three overlapping clusters.

FIG. 1 shows two adjacent rooms A,B housing a number of devices or nodes formed into three overlapping clusters. The combined RF coverage of the first cluster (clear nodes N1 in room A) is represented by line RF1, that of the second cluster (shaded nodes N2 in room B) by line RF2, and that of the third cluster (crossed nodes N3 in room B) by line RF3. As can be seen, at least some of the nodes in each cluster are within the RF range of nodes from another cluster. With all nodes supporting a common set of communications protocols and transmitting on a common frequency, there is a strong likelihood of interference or mis-control between devices of adjacent clusters unless all communications can be targeted to specific devices.

To avoid these problems of interference, a simple network-device hierarchy is imposed. All communications contain both a network address (cluster address) and node address (device address) within that network. Devices ignore communications which do not contain their network and node addresses, or their network address and a global address used for broadcast messages intended to be received by all devices of a cluster. Thus, not only do nodes belong to networks which operate independently of each other, but every product within a network can be addressed individually using its node address.

Network and node addresses are established by an installation procedure performed when the device is first introduced. Installation is automated to minimise user involvement and eliminates the need for users to have system knowledge. The procedure prevents nodes from joining the wrong network and allows the user to expand the network from a single node. The installation procedure is described in detail in our United Kingdom patent application no. 9715858.8 filed Jul. 29, 1997 and entitled "Wireless Networked Device Installation".

Figure 2:
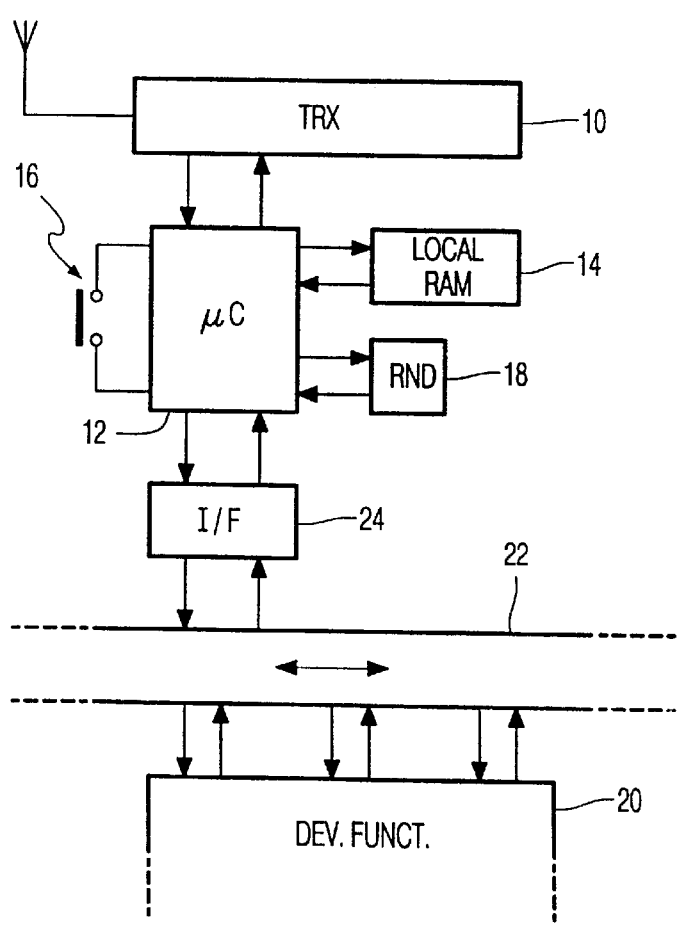
FIG. 2 is a block diagram representing functional features of a first embodiment of cluster device.

FIG. 2 shows a first embodiment of node device comprising a transceiver 10 coupled with a microcontroller 12 which in turn is coupled with a local memory 14 holding addressing and other data to be described hereinafter. The transceiver 10 provides for transmission and reception of RF messages to and from other devices of a cluster under the direction of the microcontroller 12. A single user control 16, such as a push button, is coupled with the microcontroller 14 to provide a means for initiating the installation procedure, and the microcontroller 12 is further coupled to a random number generator circuit 18 for use in the installation procedure.

The embodiment shown has the components required for RF communications relatively distinct from the functional features of the device being connected, represented by block 20, as may be the case where components 10, 12, 14, 16 and 18 are provided to convert an existing device to function as a cluster device. As illustrated, the device functions 20, via an address and data bus 22 of the device, are coupled to the microcontroller 12 via an interface circuit 24 handling any required features such as signal level conversion.

The skilled practitioner will recognize that many variations to the arrangement of FIG. 2 are possible. Where the device functions 20 are relatively simple, for example the device is a simple detector for a security system, there may be no system bus and no need for an interface, with the device functions 20 coupled directly to the microcontroller 12. Alternatively, where the device functions 20 include available processing and storage capacity, the functions ascribed herein to the microcontroller 12 and store 14 may be handled in tandem with other processing and storage functions of the device.

Figure 3:
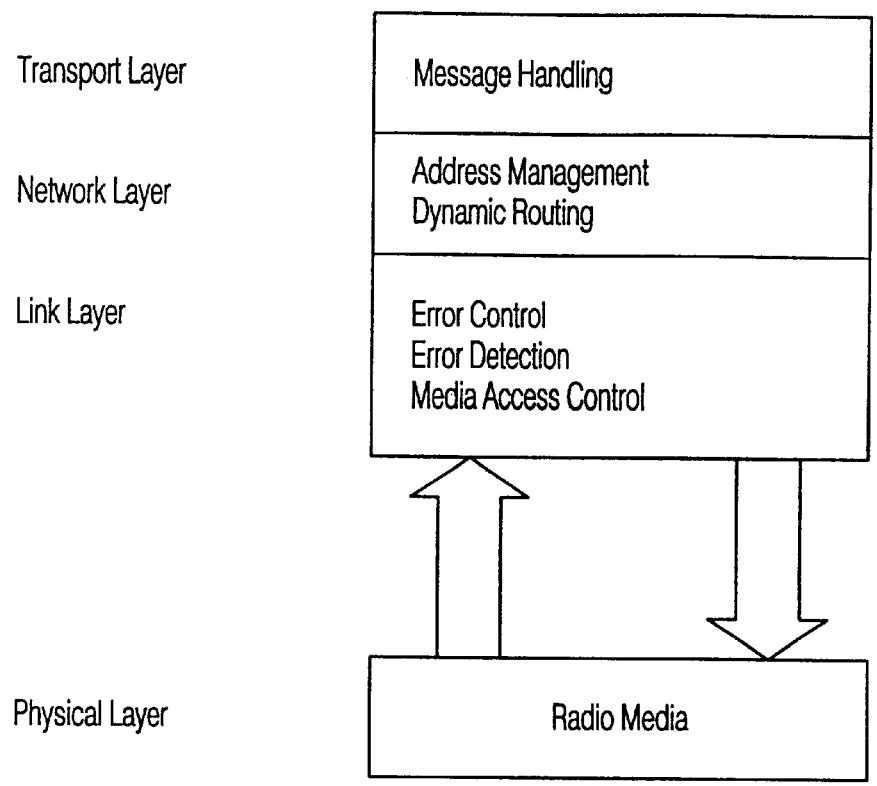
FIG. 3 schematically represents different levels in a communications protocol supported by the clusters of FIG. 1.

FIG. 3 represents the various levels of the communications protocols supported by the device of FIG. 2. At the lowest level is the physical layer represented by the radio media. Above this is the link layer, comprising error control and detection for transmitted and received messages as well as media access control (MAC). The use of a common MAC protocol, specifying amongst other things signal packet duration and repeat timings, avoids physical interference between signals in the system. Above the link layer is the network layer handling address management and dynamic routing, and above that is the transport layer responsible for message handling.

Figure 4:
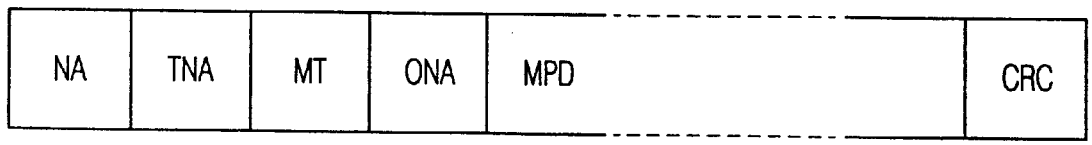

FIG. 4 represents the generic arrangement of message packets transmitted between devices of a cluster. Packets of all message types start with the same four fields and end with the same field. The first field is the network address NA which is an 8-bit address identifying the network to which the communicating nodes belong. The second field carries the target node address TNA which is an 8-bit address identifying the target node or device that the data packet is intended for. The third field carries a message type MT indicator which is an 8-bit field identifying the type (or purpose) and status of the packet. The message type field uses 6 bits to indicate either that the packet is an application message or that it is one of a number of specific network messages, including message fail MF, as will be referred to below. The two remaining bits are respectively used as toggle bit for duplicate packet detection (with the CRC field) and for flagging whether the packet has been transmitted via another node.

The fourth standard field of the message packet carries the originator node address ONA which is an 8-bit address identifying the node or device originating the data packet. For each of the address fields NA, TNA and ONA, a value of 0 is used to indicate that there is no specific address (TNA=0 for broadcast messages) or the address is unknown.

The next field MPD is message/packet dependent, and will be described below.

The final field CRC is a 16-bit word used for cyclic redundancy checking. The checksum used for error detection of the packet is derived from the packet data from the start of the network address to the end of the data field. Following receipt of a packet, if the packet carries an application message rather than a network message, the CRC field is recalculated and the recalculated value transmitted back to the source device to provide a hand-shake reply. If the received packet was erroneous, the CRC calculated at the destination will not match that in the received packet, nor will the hand-shake message (the re-calculated CRC) match that originally calculated for the error-free message prior to transmission, alerting both sender and recipient of the error. Because of the possibility of error occurring in return of the hand-shake only (that is to say the data packet itself was safely received), each node is configured to check successively received packets, as may be sent by a node receiving no handshake reply to a first message packet, and to discard duplicates. In some circumstances, it may be necessary to actually send the same data in two successive packets; to avoid rejection of the second packet as a duplicate, on sending the second packet the source will invert the toggle bit in the MT field to produce a different CRC value for the packet as a whole. The receiving device, on receiving successive packets carrying identical data will not discard the second as a duplicate if the CRC's of the packets differ and are valid.

For many of the network messages, no additional data is required, and consequently the MPD field of the packet is omitted. For application messages, however, the field is used to carry data and a number of further indicators, as will now be described with reference to FIGS. 5 to 7.

FIG. 5 shows a general form of application message packet, with the NA, TNA, MT, ONA and CRC fields as in FIG. 4, and the MPD field comprising fields for packet number PN, data length DL and data DA. The packet number PN field comprises 8-bits indicating the packet's logical position in the message (from 1 to 255): where the packet is the first of a message (i.e PN=1) the packet includes an additional field immediately prior to data DA, the additional field indicating the total number of packets TNP in the message, as shown in FIG. 6.

As the overall length of the packet is not necessarily constant, the data length DL field is included as an 8-bit value specifying the length of the data field DA in bytes. The data field DA is an integer number of bytes long (as specified by the DL field) and is limited by system constraints, from the MAC protocol, giving the maximum "window" for a packet's transmission and reception of the corresponding hand-shake. A typical window may be 50 to 60 milliseconds duration, with longer messages divided up, as indicated by the use of the PN and TNP fields.

Turning to FIG. 7, with the system supporting a dynamic message routing functionality (to be described with regard to FIGS. 10 to 13) the packet includes three further fields between the data length DL and data DA fields (or DL and TNP when PN=1) when the above mentioned flag bit in the MT field is set. These three 8-bit fields respectively specify a destination node address DNA, source node address SNA and hop count HC as will be described.

Figures 8, 9:
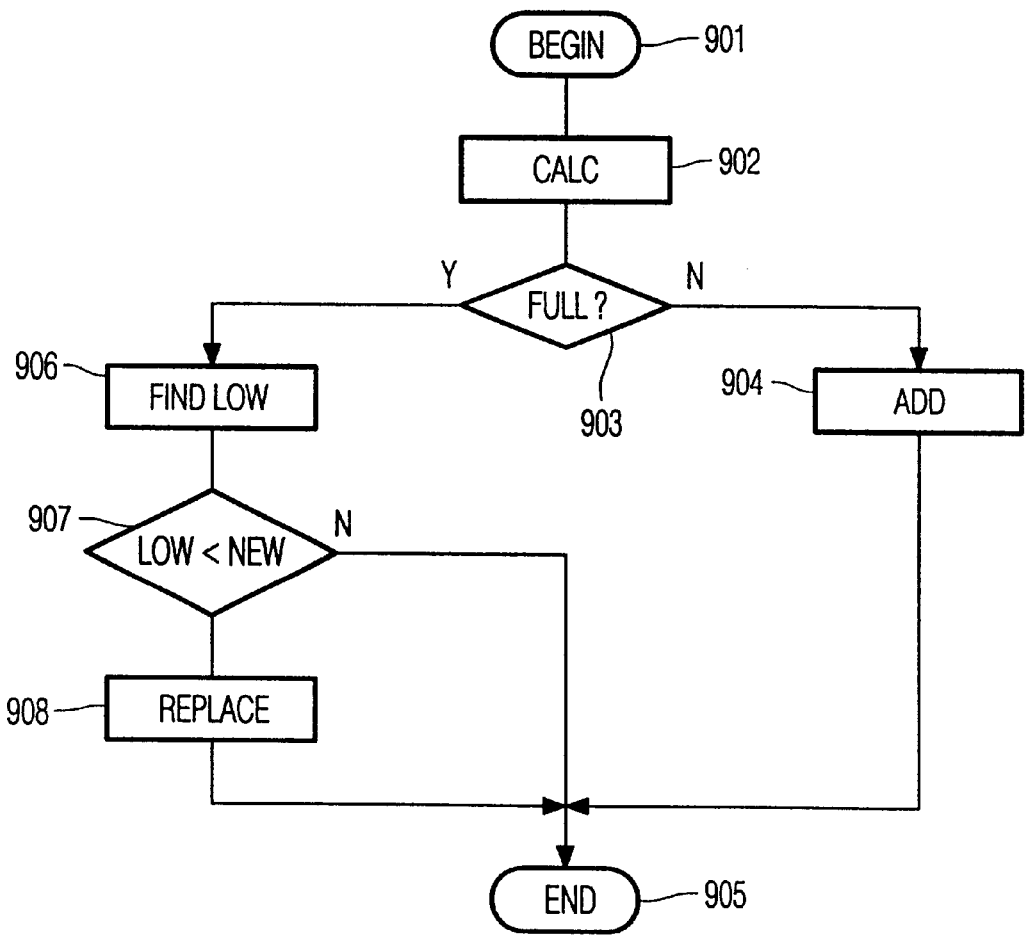
FIG. 8 is an example of a node table as held by a device in a cluster.
FIG. 9 is a flow chart illustrating a maintenance procedure for updating the node table of FIG. 8.

Newly inducted devices to the cluster perform an enrolment routine. Enrolment is preferably repeated periodically so that devices of a cluster have up to date information on which devices exist and what features they have. The enrolment signal is a packet as in FIG. 4, with the message type MT byte indicating enrolment and the MPD section carrying the defining data for the various features. This information is stored in a locally held node table, an example of which is shown in FIG. 8. A device will clear another device's entry from their node table after a predetermined period (for example, 15 minutes) if that device has not re-enrolled. This feature is particularly useful for automatically detecting the loss or removal of a node.

The node table holds the device address (node address) of at least some of the other devices, together with a list of feature flags for each of those devices and a feature score. The feature flags indicate generic features of the devices: a classification for system features may be:

1. Display (for example LCD, television, monitor)
2. Entry (for example, keyboard, remote control handset)
3. Sensor (for example, passive infra-red, thermostat)
4. Actuator (for example, light switch, door lock)
5. Storage (for example, computer hard drive or CD ROM)
6. Communications (for example, telephone or infra-red)

The feature score is specific to the device holding the table and is calculated by summing the number of features each device possesses that are of interest to the device holding the table. In the example of FIG. 8, the holder requires a device having features 1, 2 and 5 (display, entry and storage) and identifies the device with node address 1 as the most likely to fulfil these requirements.

The node table maintains information on all devices in the networked cluster (or at least those that are in communication with the device holding the table) or a sub-set selected using feature scores to discard those least likely to be useful once the network has expanded to the point where the node table would otherwise exceed the available storage space. FIG. 9 represents the procedure applied which acts as a pre-filter for the application, maintaining knowledge of those devices with which the application is likely to communicate in preference to those nodes classified, by virtue of their feature scores, as less likely to be of use. It will be recognised that the broad grouping of the generic node features may result in some devices having a feature score which exceeds their actual usefulness to the device holding the table and consequently a mechanism is provided whereby devices specifically identified as relevant (for example those devices with which the device in question has recently communicated) can be "locked" to prevent them from being removed from the node table when a device with a higher feature score is added to the cluster.

The maintenance procedure begins at step 901, suitably triggered by the detected installation of a new device to the cluster. On receipt of the enrolment data message packet from the new device, the feature flags for that device are noted and a new feature score calculated (step 902). At step 903, a check is made to see whether the device node table is full. If not, at step 904 the node address, feature flags and feature score for the new node are added to the table and the procedure ends (step 905). However, if at step 903 it is determined that the device already has a full node table, the existing device listed in the table having the lowest feature score (and not being a locked device) is identified. At step 907, the feature score of the selected existing table entry is compared with that of the new device, if the new device has a lower feature score than that of the identified device from the table, the details of the new device are discarded and the procedure ends (step 905). If, on the other hand, the new device has a higher feature score than the lowest existing in the table, then at step 708 the node address feature flags and feature score for the new device are added to the table in place of those of the previously identified table entry. Following replacement, the procedure again ends (step 905). It should be noted that, in order to avoid multiple entries due to the periodic re-enrolment requirement, each device is configured to maintain in its table only one entry from each node address.

Figure 10:
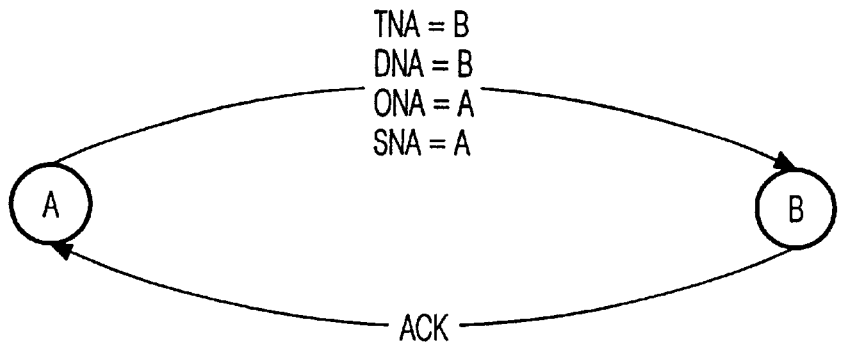
FIGS. 10 to 12 represent direct and indirect communication between devices of a cluster in accordance with a dynamic routing arrangement.
Figure 11:
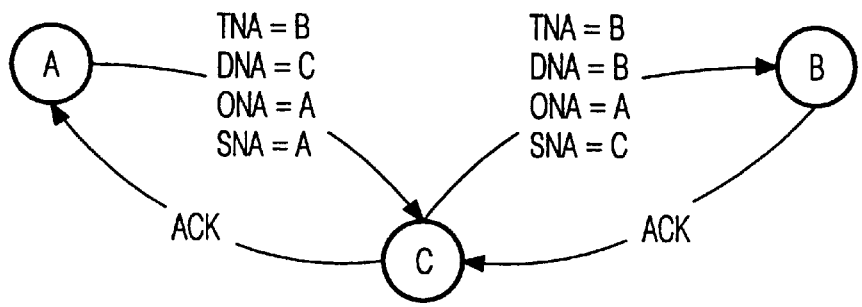
Figure 12:
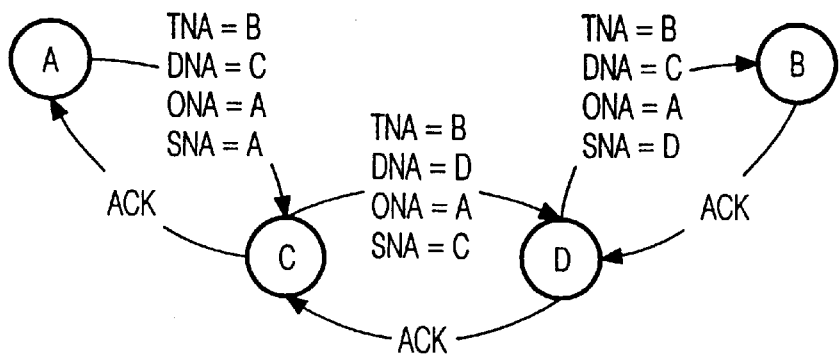

Turning now to FIGS. 10 to 12, nodes attempt to communicate directly (as in FIG. 10) but, if direct communication fails then the transmitting node will randomly select another node from the list held in its node table and transmit the packet to that node instead. The node receiving this packet will attempt to transmit it to its original destination (target) node, using other randomly selected nodes as "stepping stones" where necessary. The number of attempts that a particular node will make before attempting to dynamically re-route a packet by another node or nodes may, in a simple implementation, be a preset value such as three or four attempts: in a more complex system, the value may be determined dynamically by reference to message traffic levels and/or the number of nodes in a cluster.

The dynamic routing makes use of the two additional data fields in the application message configuration of FIG. 7, namely destination node address DNA and source node address SNA. DNA and SNA are used since, regardless of whether the packet has been sent directly or via a number of other nodes, it retains in field TNA the address for its ultimate target node and in ONA the address for the node which actually originated the packet. In the example of FIG. 10, the packet is transmitted direct and the destination and target are the same (TNA=DNA=B): likewise, the point of origin and the packet source are the same (ONA=SNA=A). This example is purely for illustration: for direct messages there would be no requirement for fields DNA and SNA which would be absent from the packet.

Where it becomes necessary to re-route the message (such as via a node C as shown in FIG. 11) the additional fields DNA and SNA come into use. As shown, in the first "hop", from node A to node C, the packet target (TNA) remains node B but the destination (DNA) is now C. For this leg of the message ONA=SNA=A. From node C, the packet is now passed to its original target destination of node B, thus TNA=DNA=B. However, since node C is not the originator of the packet, ONA=A while SNA=C. FIG. 12 shows the procedure extended to re-routing via two intermediate nodes C and D. It will be noted that acknowledgement signals following the successful reception of a packet by a re-routing node or target node follow the same path as the message packet itself: in the example of FIG. 12, the acknowledgement message from C to A follows successful packet reception by C (possibly after a number of failed attempts by A). Once the acknowledge message has been sent to A, node C then commences attempts to transmit the message to D.

When re-routing message packets, the packet layout does not change and so it is necessary for intermediate nodes to receive messages having a different node address for the target address, that is to say a node must accept messages having their address in either the TNA field or destination node address field DNA. Rather than requiring each packet to contain a potentially redundant DNA field, the above-mentioned flag bit in the message type MT field is used to indicate whether the message packet is a re-routed packet, thus alerting receiving devices to check the DNA field for their address.

The technique of dynamic routing is based on the assumption that the failure rate of links between nodes will be low (excepting node failures or transceiver misalignment for infra-red applications). There will therefore be a low probability of a direct link failing and a still lower probability that an alternative (re-routed) link will fail. As will be recognised, the dynamic routing mechanism means that packets in a data transfer may arrive at the target node in the wrong order. This, however, can be corrected at the target node by reference to the packet number PN field within the packet.

If the target node specified in a particular packet does not exist due to failure or removal, this may not be immediately apparent to the originating node (at least until the next round of enrolment procedures) and the originating node will assume that the target node exists but is out of communication with it. In consequence, the originating node will attempt to re-route packets via one or more intermediate nodes, as described above. With each node being arranged to try re-routing an unsuccessful packet transmission, a problem could arise with message packets being endlessly passed between devices of a cluster.

In order to avoid the problem, a limit is placed on the number of times that a message packet may be re-routed (the number of message "hops") with a current count of the number of re-routing operations being held within the packet itself in a hop count HC field (see FIG. 7). Each time a node forwards a message packet to a node other than its specified target TNA, the node increments the hop count HC by one. When the hop count reaches a predetermined value, the node holding the packet at the time will send a message fail MF network message to the packet's originating node address. At the same time, the node discards the packet. It should be noted that, because the failure message MF is a network message, the node generating it will transmit the MF message directly, that is to say with no error control or permitted re-routing.

Figure 13:
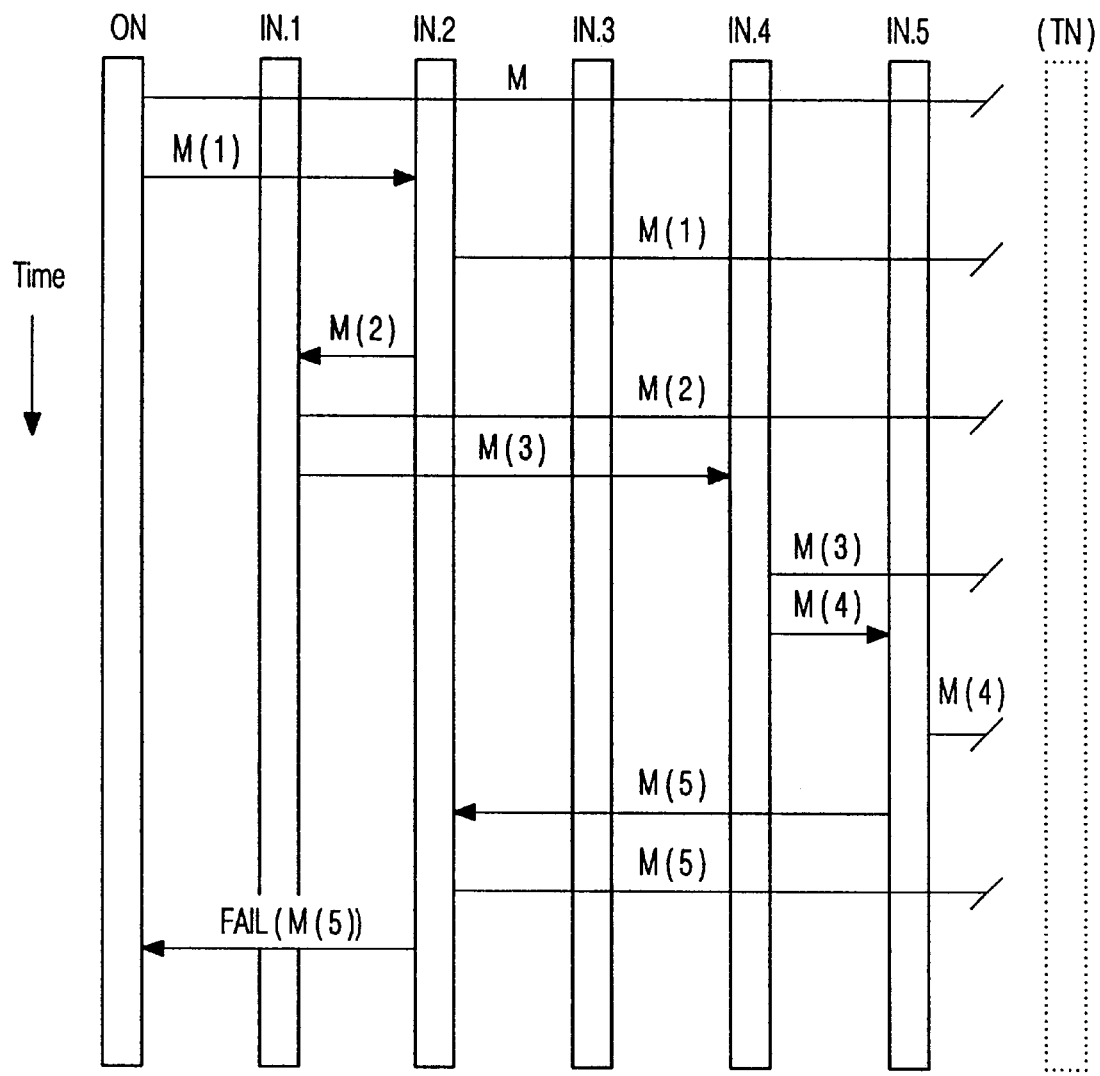
FIG. 13 represents a procedure for controlling the dynamic routing arrangement of FIGS. 10 to 12.

FIG. 13 represents a communication session during which an originator node ON is attempting to transmit a packet to a non-existent or non-functional target node (TN) with re-routing via one or more intermediate nodes IN1 to IN5. In the Figure, message transmissions are indicated by M with the number in the following brackets indicating the hop count. Initially, the originating node ON makes an unsuccessful attempt to transmit directly to the target node TN. After incrementing the hop count to 1, the originating node selects intermediate node IN2 as a re-routing point and transmits the message packet (successfully) to that node. Note that, for the purpose of clarity, hand-shake signals are not shown in the diagram of FIG. 13; also, only a single attempted transmission from each source to destination is shown although in practice there will be a number of attempts (e.g. three or five) before the path is regarded as blocked and the packet re-routed.

Having received the message packet, intermediate node IN2 attempts to transmit to target node TN and, having failed, intermediate node IN2 increments the hop count and passes the message packet to another randomly selected intermediate node, in this case IN1. Following further unsuccessful attempts, the packet is re-routed via intermediate node IN4, then IN5, then back to IN2, which receives the packet with the hop count standing at 5—the value selected as the limiting hop count in this case. When the attempt at transmission to the target note TN again fails, intermediate node IN2 determines the packet's originating node address and sends a message fail MF to the originating node and deletes the packet. As with the number of attempts before re-routing is used, the maximum accepted hop count may either be preset or may be determined dynamically by reference to, for example, the number of nodes.

Other considerations of a wireless communications system, not described above and not bearing on the operation of the present invention will be apparent to the skilled reader. For example, to reduce power consumption (particularly where the cluster device is portable and battery powered) the transceivers may be generally powered down but woken periodically to check for messages.

In the foregoing, we have described a wireless communication system which, through having distribution system functionality, supports dynamic routing (or re-routing) of message packets to minimise problems due to multi-path errors in RF communications and line-of-sight blocking of IR links. The system arrangement has a wide range of applications, including remote control of consumer electronics products, as a control channel for managing cordless audio/visual signal transfer, home automation (in like manner to the home bus systems mentioned in the introduction), game controllers, security detectors, cordless keyboards, data links (such as between a personal computer and handheld device), and telemetry (such as for remote meter reading). The device features required to enable an apparatus to operate according to the present invention will, in many cases, require only the addition of a transceiver device, and the resulting system does not require a specialized base station thereby minimizing start-up costs and reducing the system's vulnerability to device failure.

From reading the present disclosure, other modifications and variations will be apparent to persons skilled in the art. Such modifications and variations may involve equivalent features and other features which are already known in the field of cordless communication systems and components and which may be used instead of or in addition to features already disclosed herein. Although claims have been formulated in this Application to particular combinations of features, it should be understood that the scope of the disclosure of the present application includes any and every novel feature or any novel combination of features disclosed herein either explicitly or implicitly and any generalization thereof, whether or not it relates to the same invention as presently claimed in any claim and whether or not it mitigates any or all of the same technical problems as does the present invention. The Applicants hereby give notice that new claims may be formulated to such features and/or combinations of such features during prosecution of the present application or of any further application derived therefrom.

What is claimed is:

1. A wireless communication system, comprising: a plurality of nodes clustered for an exchange of data and control message packets, each node having a unique address within the system, and each node being arranged to ignore received messages not containing their own node address, and each node being arranged to transmit an acknowledgement message to an originating node of a data packet received directly, and each node being arranged to periodically perform an enrollment routine, and each node being arranged to automatically detect a loss or removal of another node in the system, and characterized in that each node further comprises: a store holding a node address for each other node in the system, the store further holding at least one feature flag for said each other node and a feature score, on determining lack of receipt of an acknowledgement message for a message packet transmitted to a target node, each node being arranged to randomly select a further node address from the store and transmit a re-routed message packet to said target node, on determining lack of receipt of an acknowledgement message for the re-routed message packet, each node being arranged to randomly select two further node addresses from the store and re-transmit a re-routed message packet to said target node using said two further nodes.

2. A system as claimed in claim 1, wherein each node is configured to generate and transmit an acknowledgement message to the transmitting node of a successfully received message packet, with each node re-transmitting a message packet a predetermined number of times to a destination node if an acknowledgement is not received within a predetermined period.

3. A system as claimed in claim 2, wherein each node is operable to select, on determining the lack of a received acknowledgement message for a re-routed message packet, a still further node address from store, other than those of the target node and message originating node, and to transmit said message packet to said still further node as a re-routed message.

4. A system as claimed in claim 3, including means to limit the number of re-routed transmissions of a message packet to a pre-determined number of re-routed transmissions.

5. A system as claimed in claim 4, wherein each message packet carries a data field reserved to indicating unsuccessful transmission of said message packet as a re-routed packet, each node having means to modify said data field to increment the value on determination that no acknowledgement message has been received following transmission of the packet as a re-routed message packet.

* * * * *